United States Patent
Schott

[11] Patent Number: 5,850,466
[45] Date of Patent: Dec. 15, 1998

[54] GOLDEN TEMPLATE COMPARISON FOR ROTATED AND/OR SCALED IMAGES

[75] Inventor: Jean-Pierre Schott, Cambridge, Mass.

[73] Assignee: Cognex Corporation, Natick, Mass.

[21] Appl. No.: 391,842

[22] Filed: Feb. 22, 1995

[51] Int. Cl.$^6$ .............................. G06K 9/68; G06T 3/20; G06T 3/40; G06T 3/60

[52] U.S. Cl. .......................... 382/141; 382/218; 382/295; 382/296; 382/298

[58] Field of Search ..................................... 382/148, 151, 382/149, 215, 216, 217, 218, 221, 141, 145, 209, 294, 124; 437/8; 250/559.45, 559.39, 559.41, 559.46; 348/87, 92, 125, 126, 129, 130

[56] References Cited

U.S. PATENT DOCUMENTS

| | | | |
|---|---|---|---|
| 4,589,140 | 5/1986 | Bishop et al. | 382/148 |
| 4,658,428 | 4/1987 | Bedros et al. | 382/216 |
| 4,809,341 | 2/1989 | Matsui et al. | 382/144 |
| 5,046,109 | 9/1991 | Fujimori et al. | 382/144 |

OTHER PUBLICATIONS

Silver, W.M., and Schott, J–P, "Practical Golden Template Comparison", Proceedings of International Automation Conference, Detroit MI; Jun. 6, 1990.

William M. Silver; *Golden Template Comparison*; Oct. 1990; Sensors; pp. 20–26.

Primary Examiner—Scott Rogers
Assistant Examiner—Brian P. Werner
Attorney, Agent, or Firm—Russ Weinzimmer

[57] ABSTRACT

A method for Golden Template Comparison (GTC) is provided that can be used to efficiently perform flaw and defect detection on a two-dimensional test image that is at least rotated and/or scaled and/or sub-pixel translated. Run-time inspection speed and accuracy is substantially improved by retreiving a golden template image that is rotated and/or scaled and/or translated in a manner substantially similar to the test image. This is accomplished by storing, in an array, a varied plurality of golden template images, each golden template image being characterized by a different combination of at least rotation and/or scale and/or sub-pixel translation. The array is indexed by the respective quantized rotation and/or quantized scale and/or sub-pixel translation of each version of the golden template image. The array can be either one-dimensional or multi-dimensional. At run-time, the values of the rotation and/or scale and/or sub-pixel translation of each test image are measured, and then quantized, thereby providing a unique index into the multi-dimensional array of reference and threshold images. The reference and threshold images stored at the memory location corresponding to the index are retrieved and then used for comparison with the test image to provide a difference image to be analyzed for flaws or defects.

9 Claims, 4 Drawing Sheets

PRIOR ART

GOLDEN TEMPLATE COMPARISON FOR ROTATED AND/OR SCALED IMAGES

FIELD OF THE INVENTION

This invention relates generally to machine vision, and particularly to flaw and defect detection based on comparison of digitized images acquired by a machine vision system.

BACKGROUND OF THE INVENTION

Golden Template Comparison (GTC) is a method for comparing a test image acquired at run-time to an ideal reference image, called a golden template, using an associated threshold image, both created during a training phase. To compare the test image to the golden template image, the images must be registered, and then subtracted. The resulting difference image is thresholded using the associated threshold image, and then analyzed for features that indicate flaws or defects.

The test image is typically a scaled, rotated, and translated version of the reference image, with defects and/or process variations. However, in present versions of GTC, such as the version of GTC sold by COGNEX CORPORATION, Natick, Mass., the reference image is neither rotated nor scaled; only translations in 'x' and 'y' can be compensated to improve registration accuracy. Consequently, image misregistration occurs, causing spurious flaw or defect information to be introduced into the resulting difference image. Thus, at present, the performance of GTC is impaired whenever a test image is rotated and/or scaled even slightly with respect to the reference image.

Traditionally, when a rotated and/or scaled test image is analyzed for defects, the extent of rotation and/or scaling of the test image is measured at run-time, and then the test image must be rotated and/or scaled so that angular orientation and scale of the test image is the same as the angular orientation and scale of the reference image. The rotated and/or scaled test image is then compared to the reference image. In this case, the overall performance of GTC is dominated by the accuracy of the rotation and/or scaling step. Consequently, since good rotation and/or scaling steps that preserve image details are computationally intensive, rotating and/or scaling the test image at run-time prior to comparison with the reference image may not be practical for some applications.

SUMMARY OF THE INVENTION

A method for Golden Template Comparison (GTC) is provided that can be used to efficiently perform flaw and defect detection on a 2-dimensional image that is at least rotated and/or scaled. In a preferred embodiment, sub-pixel translations of the test image can also be accommodated to provide further improved accuracy.

According to the invention, run-time inspection speed is substantially improved by pre-computing and indexing a plurality of variously rotated and/or scaled and/or translated versions of the reference image and the threshold image. The plurality of reference and threshold images are characterized by a plurality of quantized rotations and/or scalings and/or translations, and are stored in a multi-dimensional array. The multi-dimensional array is indexed by the respective quantized rotation, quantized scale and/or sub-pixel translation of each version of the reference and threshold images.

At run-time, the values of the rotation angle, scale, and/or sub-pixel translation of each test image are measured, and then quantized, thereby providing a unique index into the multi-dimensional array of reference and threshold images. The reference and threshold images stored at the memory location corresponding to the index are retrieved and then used for comparison with the test image to provide a difference image to be analyzed for flaws or defects.

The invention is most useful for small rotations and/or scalings where the quantization step between angles and/or scales can be made small so as to ensure that the samples collected in each bin have very similar magnification and rotation. Consequently, the golden template image that is derived from the samples in each bin is very sharp. The invention is also useful for inspecting objects with a set of predefined discrete rotation angles and/or scales (e.g. discrete image magnifications).

BRIEF DESCRIPTION OF THE DRAWINGS

The invention will be more fully understood from the following detailed description, in conjunction with the accompanying figures, wherein.

DETAILED DESCRIPTION OF THE DRAWINGS

Golden Template Comparison (GTC) is a method for comparing a test image to an ideal reference image, called a golden template. The golden template image is created from an ensemble of various acceptable images using a statistical computation. The method is particularly suited to flaw and defect detection using 2-D digitized images of 2-D scenes that do not suffer from geometric distortion (rotation, scale, or skew). Such scenes commonly occur in conjunction with highly repeatable and rapid reproduction processes, such as semiconductor production, printing, and some graphic arts applications.

To be detected by GTC, a defect in an object must cause a change in the greyscale values of the pixels in the test image of the object. Thus, in the context of GTC, a defect is any change in grey scale value of one or more pixels of the test image beyond the normal expected variation of the acceptable images. A defect can be an erroneous or unwanted mark on an object, an incorrectly shaped feature, a surface of the wrong color, or the absence of a feature or object.

For example, GTC can be used to detect many kinds of defects particular to a wide variety of applications, such as in the production of printed material, e.g., a product label. Typical defects include streaks, wrinkles, blotches, or faded or absent features. In the production of an integrated circuit, typical defects include electrical shorts, nitride voids, or scratches.

Figure 1:
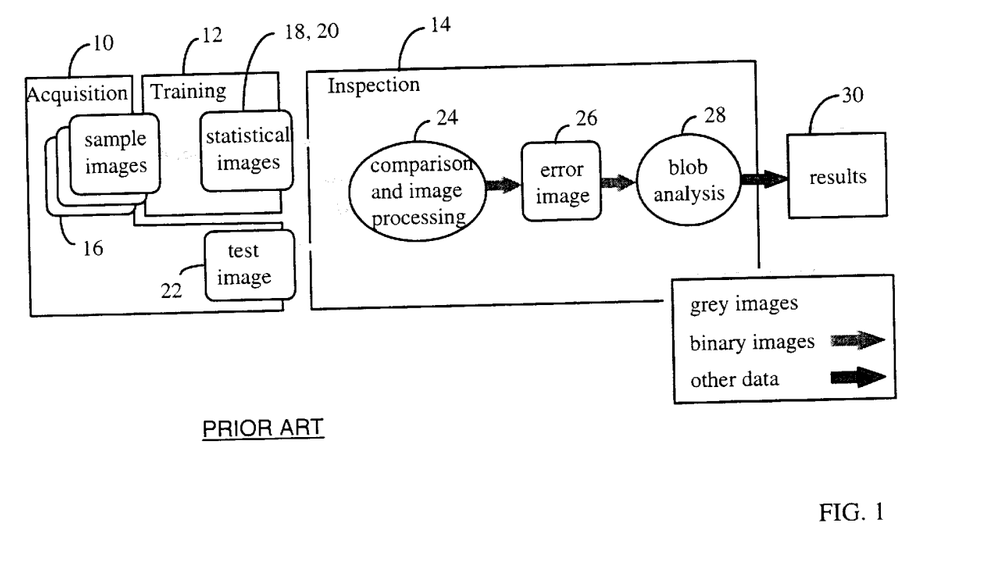
FIG. 1 is a flow diagram illustrating Golden Template Comparison.

FIG. 1 illustrates the GTC algorithm in its simplest conceptual form. GTC includes two major phases: an acquisition and training phase 10, 12, and an inspection phase 14.

During the acquisition phase 10, an ensemble of various sample images 16 are acquired, each of which is representative of correct or passing criteria. During the training phase 12, a golden template (reference) image 18, and a golden variation (standard deviation) image 20 are constructed from the sample images 16.

Defects cannot be detected unless they cause image variations that substantially exceed the image variation obtained across the set of good sample images 16. Well-designed optics and illumination can maximize the image variations resulting from defects. Good image analysis procedures substantially reduce image variation across the set of good sample images 16, resulting in increased sensitivity to defects.

The inspection phase 14 of GTC compares 24 an image of an object under test, called a test image 22, to the golden template image 18. To compare the test image 22 to the golden template image 18, the two images 18, 22 are registered with respect to each other, using either a version of normalized correlation search, or a version of the efficient image registration method described in co-pending application Ser. No. 08/299,015, now U.S. Pat. No. 5,548,326, and then subtracted to provide a difference image (not shown).

Next, the difference image is compared to a threshold image (not shown) that is computed using the standard deviation (golden variation) image 20, by a method described below at equation (5), to provide an error image 26, where each pixel of the error image 26 has a value that indicates whether or not the value of the threshold pixel has been exceeded by the corresponding pixel of the difference image. In an alternate embodiment, the error image 26 is then binarized to provide a binarized error image.

The error image 26 then undergoes a blob analysis 28 (a process for computing geometric, topological, and other properties of a plurality of connected pixels), and the results of the blob analysis 28 are stored in a data structure called a results structure 30. The results of the blob analysis 28 include a count of the defect pixels found, and the further blob analysis of the defect pixels.

Thus, the basic idea of GTC is to compare a test image to a statistical composite image (also called a golden template or reference image) of a known good scene by subtracting the test image from the golden template image, and then looking for significant differences between the two images. Although straightforward in principal, in practice GTC is not effective unless careful attention is paid to the following issues: illumination and contrast variation, sub-pixel misregistration, grey-level defect criteria, geometric and morphological defect criteria, and training the golden template from real-world samples. As recognized by the invention, rotation and scaling of the test image is also an important factor contributing to misregistration, even after sub-pixel translational misregistration has been compensated.

In particular, according to the invention, as discussed in detail below, performance can be significantly improved by constructing a plurality of golden template images that accommodate a variety of image transformations, such as sub-pixel translations in two degrees of freedom, rotations, and scalings.

We now define the basic GTC algorithm. We can write the basic GTC algorithm as follows:

$$|I-T| \geq t \qquad (1)$$

where I represents the image of the scene to be analyzed for defects (the input or test image 22), T represents the golden template image 18, and t represents the defect threshold.

Here, upper case boldface characters are used to represent images, and lower case characters to represent scaler quantities. Unless otherwise stated, operators applied to images indicate that the operation is to be applied to each pixel individually. For example, in equation (1) above, the absolute value of the difference of each pixel of I and the corresponding pixel of T (called a difference image) is compared to the threshold t. If any pixel of I differs from the corresponding pixel of T by at least the threshold value t, then the sample, and its corresponding test image, contains a defect.

The causes of image variation among test images of good samples will now be discussed. Here are the reasons that a good sample will give rise to a test image that is different from the golden template image that it is compared to:

Process variations: any reproduction process will give rise to reflectivity variations that are to be considered normal and acceptable. The magnitude of such variations is clearly application dependent. To complicate matters, the magnitude of variation may be highly dependent on image position—some regions may be very consistent while others vary considerably from sample to sample.

Scene misregistration: all mechanical positioning devices are subject to errors that cause the position of a given sample relative to the imaging device to vary from the position of the sample or samples used to create the golden template image. Scene misregistration is typically the largest component of difference image intensity variation among test images of good samples. For small misregistrations, the resulting intensity variation at a given pixel in the difference image is equal to the dot product of the misregistration vector and the image intensity gradient at the corresponding pixel in the test image. Thus, in uniform regions of the test image (characterized by low gradient) small misregistration gives rise to insignificant intensity variations among the difference images; in nonuniform regions (characterized by high gradient), for example in the neighborhood of edges, small misregistration results in substantial image intensity variations. Scene misregistration can be due to differences in sub-pixel translation of the sample relative to the sample or samples used to create the golden template image. Also, as recognized by the invention, scene misregistration due to rotation of the sample relative to the sample or samples used to create the golden template image, or scaling of the test image relative to the golden template image, can result in substantial difference image intensity variations.

Video noise: present in all imaging devices, video noise results in small intensity variations. Typically video noise is uniform but spatially uncorrelated—the magnitude of variation over a set of images is the same for all pixels, and the variation at a given pixel in a given image is independent of that of its neighbors.

Imaging variations: Illumination intensity and video amplifier gain and offset may vary over time or temperature, resulting in small difference image variations. The variations of each pixel of the difference image over a given test image are spatially correlated among all pixels of the difference image.

Scene reflectivity variations: Overall reflectivity may vary from sample to sample, or from one region of a sample to another. For example, on semiconductor wafers, the transparency of the passivation layer may vary from wafer to wafer or even across a single wafer. These variations are typically small and spatially correlated.

Template errors: The golden template itself may not be fully representative of the typical good sample. The scene from which the template was trained may contain undetected defects. Even if the training scene is flawless, its image is just as subject to the above problems as are the test images.

Image variation among good samples can be addressed in a variety of ways, each of which addresses one or more of the above mentioned causes. For example, scene misregistration can be dealt with using a suitable registration technique. Also, according to the invention, a variety of golden templates can be used that are chosen to accommodate a range of possible relative sub-pixel translations, rotations, and scalings of the test image.

Registration can be divided into two distinct phases: whole-pixel registration, discussed in this section, and sub-pixel registration, discussed below.

The purpose of whole-pixel registration is to determine the subset of the scene in the camera's field of view that corresponds to the golden template by measuring the (x,y) shift of the scene with respect to the golden template scene. We refer to this as whole-pixel registration because, although the actual scene shift is arbitrary, this subset, which becomes the GTC input image, is restricted to align with a fixed pixel grid.

Ideally, whole-pixel registration will result in a scene misregistration error of no more than ±½ pixel in x and y. For the purposes of the discussion in the previous section, it is reasonable to call this a small misregistration, and conclude that its detrimental effect is a function of image gradient.

The whole-pixel registration method must be fast and accurate, must operate on arbitrarily complex scenes, and must tolerate changes in image contrast, video noise, and image degradation. The method should also provide sub-pixel measurement accuracy for use in the sub-pixel registration step described below. A method that satisfies these requirements is gray-scale normalized correlation. To maintain accuracy and to operate on complex scenes, large correlation templates are generally required (40×40 pixels and up). It has been shown that large template correlation is practical on cost-effective hardware.

Sub-Pixel Registration

After whole-pixel registration is performed, a ≦½ pixel translational misregistration error remains that will cause substantial image variations in regions of high gradient. This residual error is called the sub-pixel translation of the scene.

Although the whole-pixel registration step can only shift the image by an integral number of pixels, it can measure the actual scene shift to sub-pixel accuracy. In practice, it is reasonable to expect approximately ±⅛ pixel accuracy from a good interpolation method. This sub-pixel phase measurement can be used with a digital resampling algorithm to shift or translate the input image by an amount in the range ±½ pixel, compensating for the translational misregistration error left after whole-pixel registration. Alternatively, this sub-pixel phase measurement can be used to perform statistical training on input images at various sub-pixel displacements, as explained below.

There are two ways of implementing digital resampling: perform the resampling on the input image at run time, or store a number of re-sampled golden templates at training time and simply choose the appropriate one at run time. This is a classic memory/speed tradeoff. To do the resampling at run time and satisfy our speed requirements would require special hardware, use of a crude algorithm, or both. There will be a run-time speed penalty regardless, but no extra memory is needed. To store the templates as a training step would require large amounts of memory, but allows the use of more effective resampling algorithms and results in no run-time speed penalties.

Storing sixteen 512×512-pixel templates requires 4 Mbytes of memory and provides ±⅛ pixel precision. Any additional precision would be of little value due to accuracy limitations of both shift measurement and resampling. In practice, nine templates would usually suffice (±⅙ pixel resolution) to compensate for translational sub-pixel shifts, without regard for rotation and/or scaling compensation. For systems that must hold many different templates, mass storage can be used. Since the nine or sixteen translational sub-pixel shifted versions of a template are almost identical, data compression techniques can provide considerable savings in mass storage.

Based on the speed and effectiveness considerations, as well as the low cost of memory and mass storage, it is preferable to store multiple shifted templates, rather than using a resampling algorithm.

The accuracy of x-y positioning stages is often insufficient to obtain the translational sub-pixel shifted templates simply by moving the scene by fractional pixel amounts. Instead, the preferred approach is to augment the statistical training procedure to achieve the desired result. A series of good scenes are presented at essentially random sub-pixel phases. Then, the image registration tool is used to determine the translational sub-pixel shift of each good scene, and this information is used to determine in which sub-pixel "bin" a given sample image belongs. If all of the images that fall into each such bin are averaged, an excellent representation of the appearance of the scene at each sub-pixel shift is obtained. As long as sufficient number of samples are used, positioned randomly, the results should be more representative than any resampling algorithm. Furthermore, this procedure automatically compensates for any systematic bias in the measurement of sub-pixel translation, since the same measurement algorithm that will be used at run time is used to choose the bins for training. Finally, this procedure is a trivial addition to the standard statistical training procedure, far simpler to implement than even the simplest resampling methods.

According to the invention, in addition to or instead of only sub-pixel translations, rotations and scalings of the test image can also be compensated by creating a variety of golden templates that address the range of sub-pixel translations and/or rotations and/or scalings found or expected to be found among the test images. Each test image is not rotated/scaled/translated at run-time for comparison with a single golden template image, but is instead directly compared at run-time with one of a varied plurality of golden template images that have been created at train time. Each of the various golden templates is rotated and/or scaled and/or translated to a different extent, and is indexed accordingly. At run time, for each test image, to determine which golden template should be used, the test image is registered or aligned using a tool that provides a measurement of the extent of rotation, translation, and scaling of the test image, such as the COGNEX search tool. This measurement is used to compute an index, and the index indicates the appropriate golden template within a multi-dimensional memory array.

Figure 2:
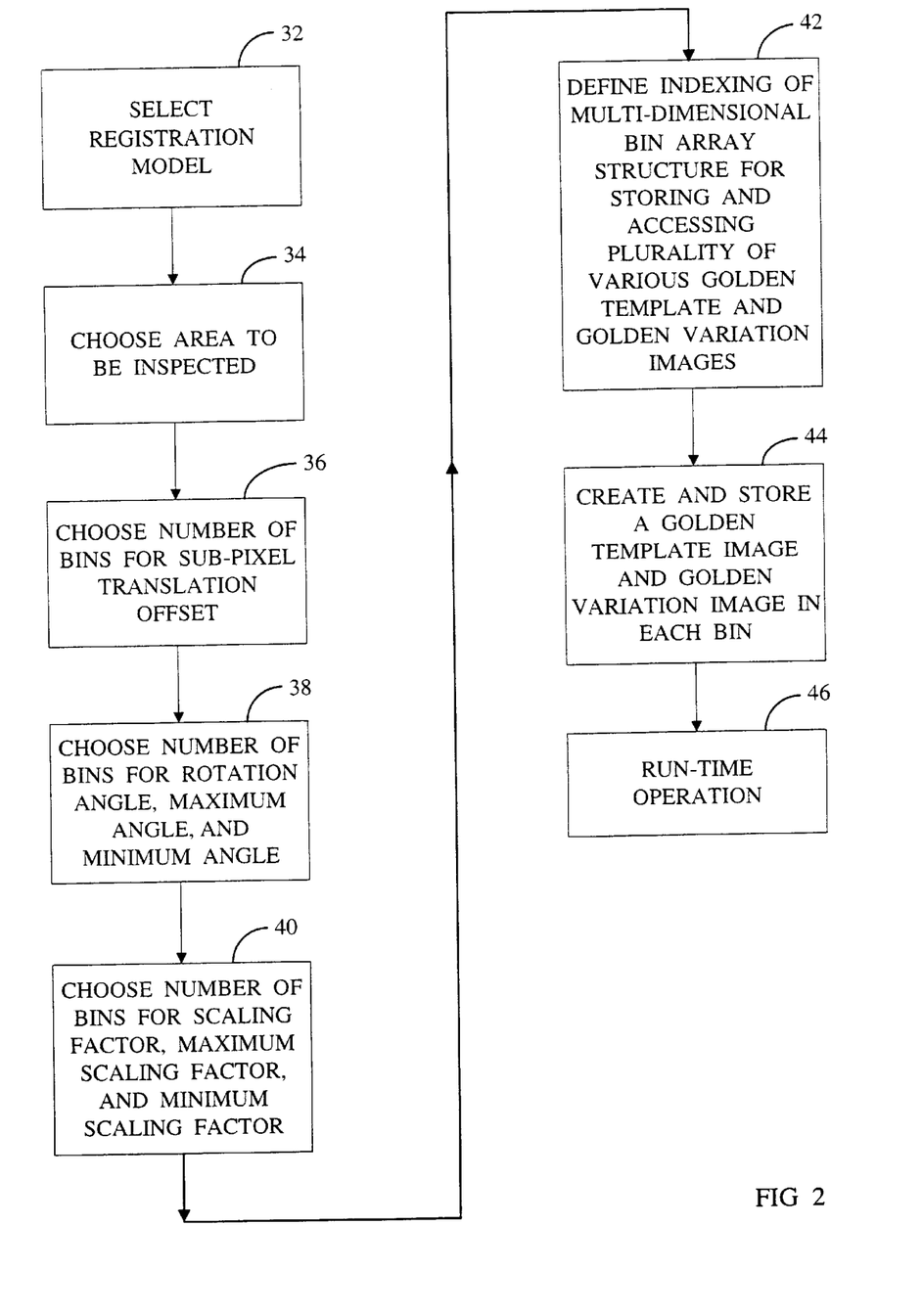
FIG. 2 is a flow chart of the invention, including the steps of initializing the multi-dimensional array structure for organizing a plurality of bins, storing a pre-determined number of golden template images and golden variation images in each bin, and run-time operation.

Referring to FIG. 2, first, a registration model is selected (32) in a defect-free run-time image, and the area of inspection (window of the image) is chosen (34). Next, the number of bins for the sub-pixel translation offset in the vertical (spy) and horizontal (spx) directions are chosen (36). The number of bins determines the quantization of the sub-pixel translation offset in the X and Y directions. For a given measured translation $(x_t, y_t)$, each component of the translation can be separated into an integral and a fractional part, where the integral part is the closest integer to the measured translation, and the fractional part is the signed difference between the measured translation and the integral part. With this definition, the fractional part is a number between −0.5 and +0.5, and the two fractional translation define a rectangle bounded by the lines X=−0.5, X=+0.5, Y=−0.5, Y=+0.5 in X,Y coordinate system. The number of sub-intervals along X and Y determine the number of subregions into which the rectangle is divided. For example, for spx=2, spy=2, four regions are defined, each being one quarter of the rectangle.

Next, the number of bins (ang) for the rotation angle φ and the maximum $\phi_M$ and the minimum angle $\phi_m$ are chosen (38). These parameters define the angle quantization step Qφ of the angle φ defined by the maximum and minimum angles $\phi_M$ and $\phi_m$, respectively, such that:

$$Q\phi=(\phi_M-\phi_m)/ang \qquad \text{Equation A}$$

Alternatively, an angle quantization step Qφ can be chosen and the number of bins ang can be computed according to:

$$ang=(\phi_M-\phi_m)/Q\phi \qquad \text{Equation B}$$

Next, the number of bins (scal) for the scaling factor S and the maximum $S_M$ and the minimum scaling factor $S_m$ are chosen (40). These parameters define the scaling quantization step $Q_s$ of the scaling factor for a given scaling range defined by the minimum and maximum scale.

$$Q_s=(S_M-S_m)/scal \qquad \text{Equation C}$$

Alternatively, a scaling quantization Qs can be chosen and the number of bins (scal) can then be computed using Equation D.

$$scal=(S_M-S_m)/Q_s \qquad \text{Equation D}$$

Next, an indexing of a multi-dimensional array for storing a plurality of data structures is defined (42), in particular, for referencing the golden template image and the golden variation image for each possible combination of quantized scale, angular offset, and sub-pixel translational offset. For example, a four-dimensional array for storing and accessing a varied plurality of golden template and golden variation images can be organized so as to be indexed by a 4-tuple (dx, dy, $\phi_n$, $S_n$):

$$sadd=badd\ [S_n][\phi_n][dy][dx] \qquad \text{Equation E}$$

where sadd is the structure address that is equal to the base address (badd) according to the 4-tuple (dx, dy, $\phi_n$, $S_n$). Here, dx is the horizontal fractional translation, dy is the quantized vertical fractional translation, $\phi_n$ is the quantized angular offset, and $S_n$ is the quantized scaling factor.

To create a 1-D array for improved access speed, use:

$$sadd=badd+(S_n\times scaleoff)+(\phi_n\times angleoff)+(dy\times spx+dx), \qquad \text{Equation F}$$

where scaleoff=ang×angleoff angleoff=spx×spy×sizeof(struct)

and spx is the number of horizontal sub-pixel bins, spy is the number of vertical sub-pixel bins, ang is the number of angular offset bins, and scal is the number of scaling factor bins. "Struct" represents the structure that contains, among other elements, the golden template image, the golden variation image, and/or the threshold image.

Figure 3A:
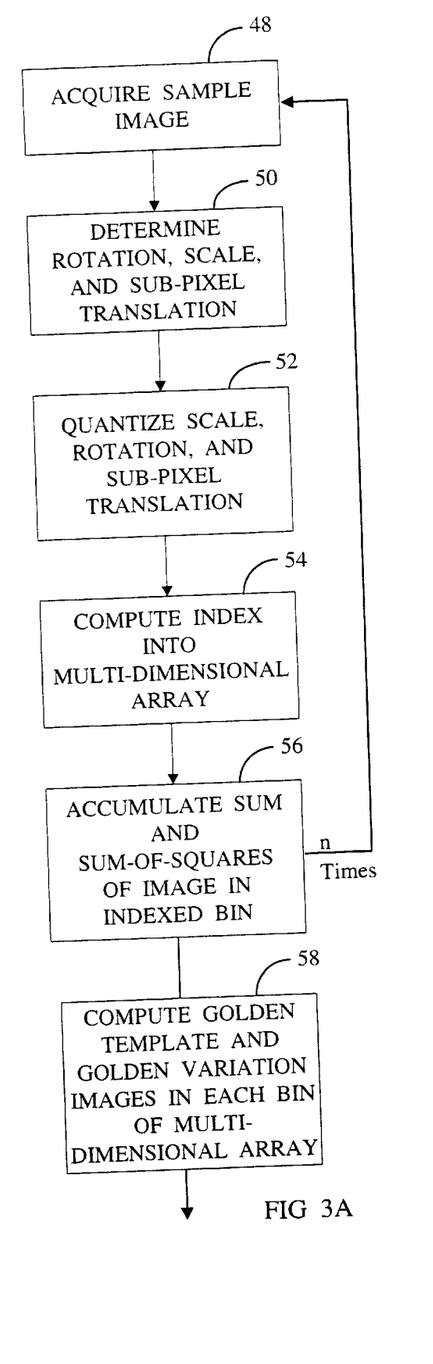
FIGS. 3A and 3B are flow charts detailing two methods for creating a golden template image and a golden variation image in each bin of the multi-dimensional array of FIG. 2.
Figure 3B:
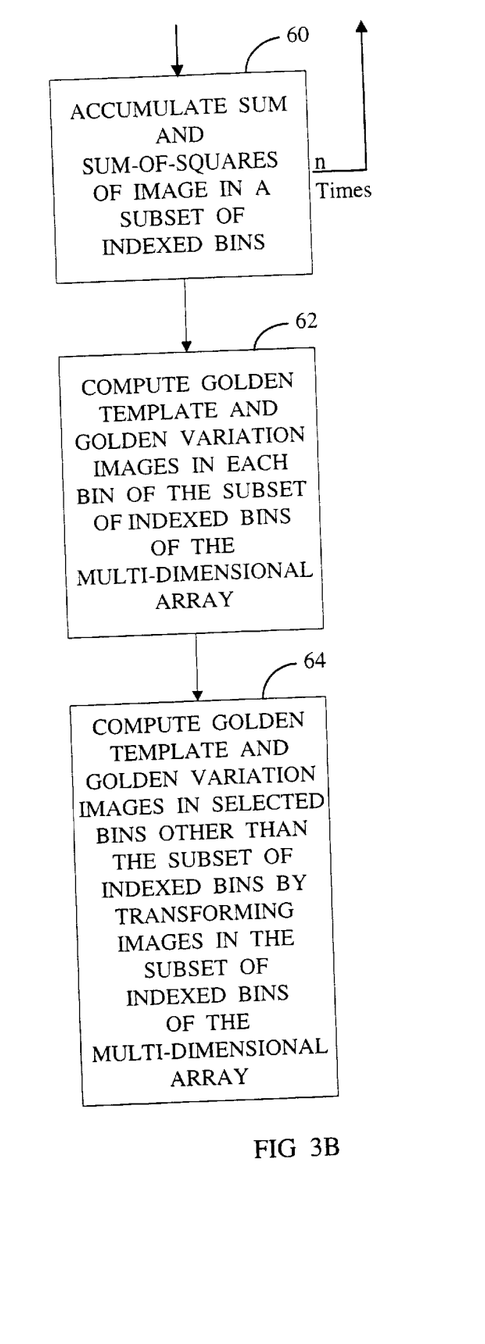

Next, a golden template and golden variation image is created and then stored (44) in each bin, as shown in detail in FIGS. 3A and 3B. The images so-stored can now be used for run-time operation (46).

With reference to FIG. 3A, to store a pre-determined number of golden template and golden variation images, there are at least two possible methods that can be used.

A first method involves acquiring (48) a variety of images, determining (50) and quantizing (52) the rotation, scale, and sub-pixel translation of each image, computing the index (54) into the multi-dimensional array according to its particular combination of dx, dy, $\phi_n$, and $S_n$, and then accumulating (56) the sum and the sum of squares of each image in the appropriate indexed bin (i.e., repeating steps 48 through 56) until each indexed bin has accumulated the sum and the sum of squares from a minimum number n of images. In each bin in the multi-dimensional array, using the sum and the sum of squares, a golden template image and a golden variation image are computed and stored (58) in the indexed bin.

Referring to FIG. 3B, a second method for storing a predetermined number of golden template and golden variation images involves repeating steps 48 through 56 as in the first method, except step 56 is modified so as to accumulate the sum and sum-of-squares for a subset of the indexed bins (60), not for all the bins. Then, after each bin of the subset of indexed bins has accumulated the sum and the sum of squares from a minimum number n of images, a golden template image and a golden variation image are computed and stored in the respective indexed bin of the subset (62). Then, to compute golden template and golden variation images to be stored in selected bins other than the subset of indexed bins, one or more of the golden template and golden variation images from the subset of indexed bins are transformed (64) so as to provide golden template and golden variation images that differ from the images stored in the subset of indexed bins. In particular, the transformation changes the rotation and/or scale and/or sub-pixel translation of a golden template and golden variation image. Thus, a golden template image and a golden variation image having a substantially different rotation and/or scale and/or sub-pixel translation from the images stored in the subset of indexed bins can be synthesized, stored, and indexed in bins other than the subset of bins.

Referring again to FIG. 2, run-time operation (46) involves selectively using the golden template and golden variation images that have been generated, stored, and indexed in the multi-dimensional array for comparison with an acquired test image, i.e., performing golden template comparison (GTC) using the images stored in the multi-dimensional array.

Figure 4:
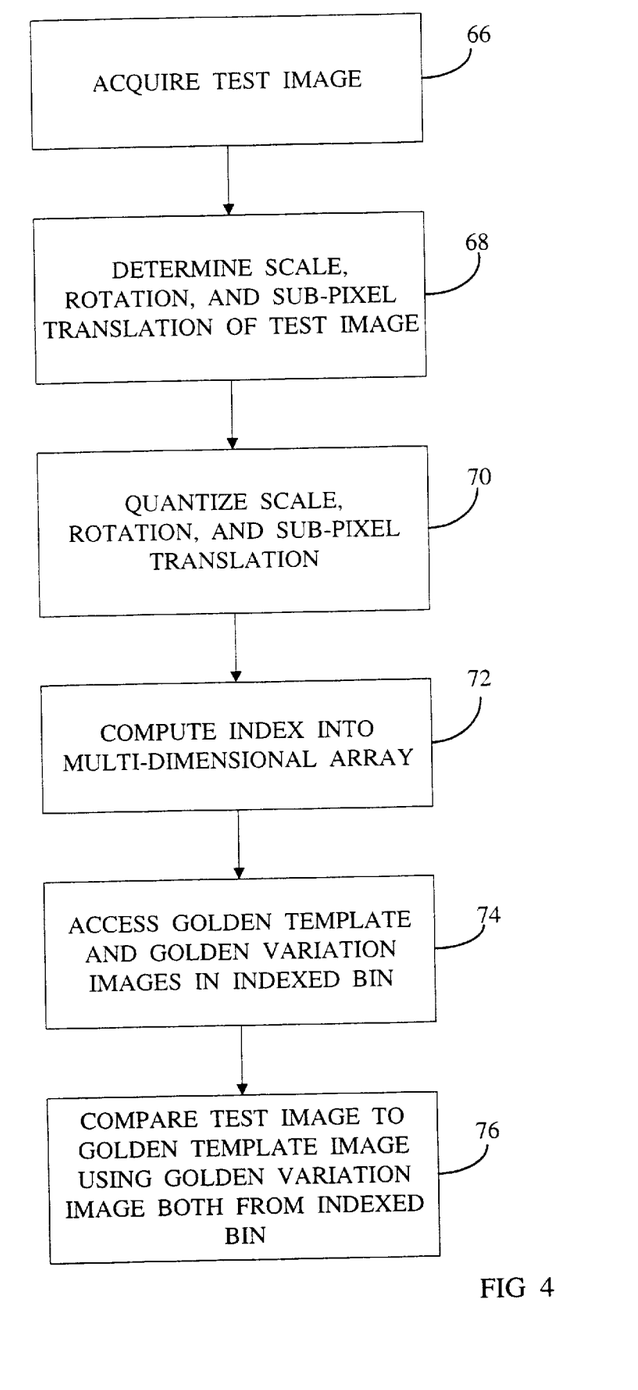
FIG. 4 is a flow chart of the steps of run-time operation of the invention.

Referring to FIG. 4, to perform GTC on a test image according to the invention, the test image must first be acquired (66), such as acquiring the test image using a video camera with an article of interest in its field of view. Of course, the test image can be acquired from a database of previously acquired or synthesized images.

Next, the characteristics of scale, rotation and sub-pixel translation of the test image are determined (68). These characteristics of the test image are obtainable by finding a model or reference feature within the test image using a search tool, such as the SEARCH TOOL sold by COGNEX CORPORATION, Natick, Mass., which returns a measurement of the rotation and sub-pixel translation of the test image. Scale information can be obtained by using, for example, the CALIPER TOOL sold by COGNEX CORPORATION, or by using scale information provided by the user.

Next, the measurement of the scale, rotation and sub-pixel translation of the test image is quantized (70), and using Equation E, F, or an equivalent, compute an index (72) into a multi-dimensional or one-dimensional array.

Then, the golden template and golden variation images stored in the indexed bin of the array are accessed (74). That particular golden template image is then compared (76) with the test image using the associated golden variation image as described herein using GTC.

The number of different angles, scales, and sub-pixel offsets that can be handled by the invention is limited primarily by the amount of available memory, and by the availability of statistically significant numbers of samples at each various scale, rotation, and sub-pixel offset to the extent that transformation cannot be employed to create the required golden template and golden variation images.

The invention considerably improves the speed of the run-time inspection phase of GTC by eliminating the need to perform digital rotation, scaling, and sub-pixel translational resampling at run-time, instead performing a measurement of the offset characteristics of at least a portion of the test image, and deriving from the measured offset characteristics an array index that is used to retrieve pre-computed or pre-stored golden template and golden variation images.

In addition, the invention facilitates the inspection of rotated and/or scaled articles that can not be inspected using present versions of GTC.

We now return to the discussion of the reasons that a good sample to be inspected will give rise to a test image that is different from the golden template image to which it is compared.

Global Contrast Normalization

The purpose of global contrast normalization is to compensate for conditions that cause image intensity to vary in ways that do not depend on position in the image. Examples include variations in illumination intensity, amplifier gain and offset, lens aperture, and scene contrast. The goal is to compute a function m and apply it to each pixel in the input image, so that the GTC algorithm becomes:

$$|m(I)-T| \geq t \qquad (2)$$

The function m is computed by comparing the statistics of I and T, based on the assumption that the majority of pixels in I are uncontaminated by defects. If the assumption does not hold then m may be wrong, but in this case I is so severely degraded that it probably doesn't matter—the scene will be judged a reject regardless.

We have investigated three methods for computing m:
- min/max (MM): Here m is a linear function chosen such that the minimum and maximum intensity values of m(I) match that of T. Since strict min and max are unreliable, we use values corresponding to, for example, 1% and 99% of the cumulative intensity distribution.
- mean/standard deviation (MSD): Here m is a linear function chosen such that the mean and standard deviation of the intensity values of m(I) match that of T.
- histogram specification (HS): Here m is a monotonically non-decreasing function chosen such that the distribution of intensity values of m(I) matches that of T.

For images subject to linear intensity transformations, the three methods are about equally effective. The HS method is the more general because it can compensate for non-linear effects such as amplifier saturation. None of the methods are clearly superior (or inferior) in all cases, however, so the choice becomes application-dependent.

Local Contrast Normalization

The purpose of local contrast normalization is to compensate for conditions that cause image intensity to vary slowly with position in the image. We apply a high pass filter f before the absolute value step, so that the GTC algorithm becomes:

$$|f[m(I)-T]| \geq t \qquad (3)$$

Statistical Template Training

The purpose of statistical training is to obtain a golden template that is representative of the population of good samples, so as to reduce the average variation between good samples and the template. As noted above, any individual sample is subject to process variations and video noise, but we can obtain a representative template by averaging many samples. For this to work, however, the images must be registered as well as possible, and must have identical global contrast. The use of a variety of golden templates, each created using sample images sorted by, for example, rotation, translation, and scaling, reduces the variability among the sample images used to create each golden template. Thus, the method of the invention for improving registration of the test, image with a suitable one of a variety of golden templates, and the above-mentioned contrast normalization procedures, are an essential part of statistical template training.

It is also essential that the samples used for training be free of defects. If we can certify a small number of samples as being defect-free, then we can average them and then use the GTC algorithm itself to test new training samples for defects. Only ones found to be defect-free would be used for statistical training. The initial set of certified defect-free samples is called the seed set.

In certain applications, we can assume that defects are random from sample to sample. In this case, any sufficiently large set of samples that are substantially identical must be free of defects, otherwise the same defect would be present in all samples, in violation of our assumption. Thus, we can use GTC to find automatically a defect-free set to serve as the seed set.

Statistical training will also be seen to be important in determining photometric defect criteria, as will now be described.

Photometric Defect Criteria

The sensitivity to defects and susceptibility to false alarms of GTC is determined in any of the above forms by the defect threshold t. The threshold is a photometric defect criterion, because it classifies pixels as good or defective based on image intensity alone. In this section we will describe a better photometric defect criterion; in the next section we will discuss criteria that are based also on shape.

If the variability over the set of good samples were uniform for all pixels, a global threshold would be appropriate. We have seen, however, that this is not the case—variability is much higher in regions of high gradient, and normal process variations can be substantially nonuniform (this is particularly true of semiconductor wafers). In order to prevent false alarms, the threshold t must be set high enough to account for the worst case variability over all pixels. Thus, the sensitivity of GTC can be compromised by a tiny population of unreliable pixels.

Clearly, each pixel position should have its own threshold, so that the GTC algorithm becomes:

$$|f[m(I)-T]| \geq V \qquad (4)$$

where V is a threshold image whose pixel values are set based on the variability expected over the set of good samples.

The best way to determine the variability at each pixel is to measure it as part of the statistical training procedure. In addition to computing the mean pixel value over the training set, we compute the standard deviation and use it to determine a threshold. This procedure automatically accounts for all nonuniform, as well as uniform, causes of variation—sub-pixel misregistration, process variations, and video noise. We compute the threshold image as follows:

$$V = t_1 S + t_2 \tag{5}$$

where S is the measured standard deviation image, and $t_1$ and $t_2$ are parameters.

The choice of the values of the parameters $t_1$ and $t_2$ depends on the particular application. $t_1$ is a multiplicative coefficient that raises the threshold in accordance with the measured standard deviation image S. The effect of $t_1$ is particularly significant in regions of high standard deviation, such as edges. $t_1$ can be selected such that erroneous defect labeling due to strong edge gradients is substantially prevented. $t_2$ is an additive term that represents an estimate of the background noise that was not captured in the measured standard deviation image S during statistical training, such as additional video or image quantization noise. $t_2$ is most important in regions of s characterized by low standard deviation that represent substantially smooth or low frequency regions of the test image. t2 can be selected such that erroneous defect labeling due to background noise that was not captured in the measured standard deviation image S during statistical training is substantially prevented.

Alternatively, in applications that do not suffer from nonuniform process variations, or where statistical training is not feasible, V can be estimated based on template gradient magnitude.

The image position-dependent component of the above photometric detect criteria is determined automatically by statistical training or image gradient; the user's only control is over the parameters $t_1$ and $t_2$. In practice, it is desirable to allow a human operator to edit V with some sort of image painting program, to raise or lower the automatically computed thresholds in selected regions based on application-dependent criteria. It should be possible for the operator to raise selected thresholds to values that exceed any possible absolute difference, effectively making those regions into "don't care" regions.

Geometric and Morphological Defect Criteria

One can dramatically increase sensitivity to small intensity variations by imposing additional criteria to prevent false alarms. These criteria can be based on the shape of a set of defective pixels. In some applications, this is simply a way of trading intensity sensitivity for defect size sensitivity—we can detect small intensity variations if the defect is at least several pixels in diameter.

In other applications, we can increase sensitivity and reduce false alarms by designing shape criteria based on application-specific knowledge. For example, in graphic arts applications we may be looking for light streaks in a particular direction, caused by some printing malfunction. The streaks may result in image intensity variations that are in the range of normal variations due to, for example, video noise. If we detected a long line of pixels oriented in the particular direction, all varying from the template by a small amount, we could conclude that the variation was caused by a streak and not video noise.

We describe two methods for imposing defect criteria based on shape—one is based on geometrical measurements, and the other is based on gray-scale mathematical morphology. For both methods it is convenient to rearrange equation (4) and define a new image, the error image E:

$$E = |f[m(I) - T]| - V \tag{6a}$$

$$E \geq 0 \tag{6b}$$

Pixels in E are considered defective if they are $\geq 0$—this is the photometric defect criterion.

The geometric defect criteria are implemented by performing connectivity analysis on E and then measuring geometric properties of the connected regions: area, perimeter, orientation of principal axis of inertia, ratio of principal moments of inertia, and others. Some application-dependent classification scheme would be defined to determine, based on these measurements, the disposition of each connected region. The calculations are made by assigning a weight to each grey level in E by means of some mapping function w, so that photometric information can take part in the classification, and to maximize repeatability of results.

The morphological defect criteria are implemented by eroding E with one or more grey-level structuring elements, masks, or probes $p_i$, in parallel or sequentially, so that equation (6) becomes:

$$E_i = \{|f[m(I) - T]| - V\} \ominus p_i \tag{7a}$$

$$E_i \geq 0 \tag{7b}$$

For a given p in equation (7a), where $A = \{|f[m(I) - T]| - V\}$, and therefore $E = A \ominus p$, the erosion operator $\ominus$ is defined as:

$$E(A, p)|_{image} = A \ominus p = \min(Aj + pj) \text{ for } j = 0 \text{ to } n \tag{7c}$$

where Aj represents the image under the mask $p_j$, and where the erosion is performed over the entire image A. In other words, to form the image E, the mask or probe $p_j$ is moved so that at each position in the image A, the probe pixel values are added to the overlapping image A pixel values, and the smallest pixel sum over the area of the probe $p_i$ becomes the pixel value of the image E at the position defined by a reference point of the probe $p_i$.

Any values $\geq 0$ that remain in any image $E_i$ after erosion are considered defects. The probes $p_i$ are designed to detect certain shapes. Examples are shown in Table 1, which is a probe designed to detect horizontal streaks, and Table 2, which is a set of 3 probes designed to detect spot defects of varying effective diameters.

TABLE 1

| -3 | -3 | -3 | -3 | -3 | -3 | -3 |
|----|----|----|----|----|----|----|
| 0  | 0  | 0  | 0  | 0  | 0  | 0  |
| -3 | -3 | -3 | -3 | -3 | -3 | -3 |

TABLE 2

| -8 | -5 | -4 | -5 | -8 | -16 | -10 | -8 | -10 | -16 | -32 | -20 | -16 | -20 | -32 |
|----|----|----|----|----|-----|-----|----|-----|-----|-----|-----|-----|-----|-----|
| -5 | -2 | -1 | -2 | -5 | -10 | -4 | -2 | -4 | -10 | -20 | -8 | -4 | -8 | -20 |
| -4 | -1 | 0 | -1 | -4 | -8 | -2 | 0 | -2 | -8 | -16 | -4 | 0 | -4 | -16 |
| -5 | -2 | -1 | -2 | -5 | -10 | -4 | -2 | -4 | -10 | -20 | -8 | -4 | -8 | -20 |
| -8 | -5 | -4 | -5 | -8 | -16 | -10 | -8 | -10 | -16 | -32 | -20 | -16 | -20 | -32 |

The grey level erosion of one of these probes with the image E, as expressed in equation (7), can be understood as follows: In equation (6), any pixel of E that is $\geq 0$ is a defect, so 0 can be thought of as a defect threshold. The probes are neighborhood threshold templates. A defect exists if any probe can be placed in some position in E such that all E values over the range of the probe equal or exceed the corresponding probe values. In these examples, the central element is 0, corresponding to the normal photometric criterion expressed in equation (6b). The surrounding values are 0 or negative, meaning that the neighbors of the central element must also satisfy, or come close to satisfying, this criterion.

In conclusion, GTC as expressed in equation (4) will not work well in practice due to extreme image variability over the set of good samples—one cannot distinguish these variations from true defects. A series of template training and image analysis methods has been presented that reduce this variation to the point where GTC can be used to detect defects reliably under real-world conditions. In addition, an invention has been presented that further improves the performance of GTC by compensating for rotations, scaling, and/or sub-pixel translations of the test image, while also significantly improving run-time performance.

Other modifications and implementations will occur to those skilled in the art without departing from the spirit and the scope of the invention as claimed. Accordingly, the above description is not intended to limit the invention except as indicated in the following claims.

What is claimed is:

1. A method for golden template analysis of a gray-scale test image, the method comprising:

acquiring a plurality of sample gray-scale images;

determining a sub-pixel translation characteristic and at least one geometric characteristic of each of said sample gray-scale images;

creating a varied plurality of golden template gray-scale images, each golden template gray-scale image being created using a plurality of sample gray-scale images having substantially similar characteristics;

storing each golden template gray-scale image in a hierarchical multiresolution one-dimensional array in accordance with an index based on the combination of said sub-pixel translation characteristic and said at least one geometric characteristic of said golden template gray-scale image;

acquiring a test gray-scale image;

determining a sub-pixel translation characteristic and at least one geometric characteristic of said test gray-scale image;

using said index to retrieve a golden template gray-scale image having characteristics that are substantially similar to characteristics of said test gray-scale image; and comparing said test gray-scale image with said retrieved golden template gray-scale image.

2. The method of claim 1, wherein determining a sub-pixel translation characteristic and at least one geometric characteristic of each of said sample gray-scale images includes determining the rotation of each of said gray-scale sample images; and determining a sub-pixel translation characteristic and at least one geometric characteristic of said test gray-scale image includes determining the rotation of said test gray-scale image.

3. The method of claim 1, wherein determining a sub-pixel translation characteristic and at least one geometric characteristic of each of said sample gray-scale images includes determining the scale of each of said sample gray-scale images, and determining a sub-pixel translation characteristic and at least one geometric characteristic of said test gray-scale image includes determining the scale of said test gray-scale image.

4. The method of claim 1, wherein comparing said test gray-scale image with said retrieved golden template gray-scale image includes:

providing an error image; and performing blob analysis on said error image so as to provide inspection results.

5. A method for golden template analysis of a test gray-scale image, the method comprising:

acquiring a plurality of sample gray-scale images;

determining at least a rotation and a sub-pixel translation of each of said sample gray-scale images;

creating a varied plurality of golden template gray-scale images, each golden template gray-scale image being created using a plurality of sample gray-scale images having a substantially similar rotation and sub-pixel translation;

storing each golden template gray-scale image in a hierarchical multiresolution one-dimensional array in accordance with an index based on the combination of said rotation and sub-pixel translation of said golden template gray-scale image;

acquiring a test gray-scale image;

determining a rotation and a sub-pixel translation of said test gray-scale image;

using said index to retrieve a golden template gray-scale image having a rotation and a sub-pixel translation that are substantially similar to the rotation and the sub-pixel translation of said test gray-scale image; and comparing said test gray-scale image with said retrieved golden template gray-scale image.

6. The method of claim 5, wherein comparing said test gray-scale image with said retrieved golden template gray-scale image includes:

providing an error image; and performing blob analysis on said error image so as to provide inspection results.

7. A method for golden template analysis of a test gray-scale image, the method comprising:

acquiring a plurality of sample gray-scale images;

determining at least a rotation and a sub-pixel translation of each of said sample gray-scale images;

creating a varied plurality of golden template gray-scale images, each golden template gray-scale image being created using a plurality of sample gray-scale images having a substantially similar rotation and sub-pixel translation;

storing each golden template gray-scale image in a hierarchical multiresolution one-dimensional array in accordance with an index based on the combination of said rotation and sub-pixel translation of said golden template image;

acquiring a test gray-scale image;

determining a rotation and a sub-pixel translation of said test gray-scale image;

using said index to retrieve a golden template gray-scale image having a rotation and a sub-pixel translation that is substantially similar to the rotation and the sub-pixel translation of said test gray-scale image;

comparing said test gray-scale image with said retrieved golden template gray-scale image so as to provide an error image; and performing blob analysis on said error image so as to provide inspection results.

8. Apparatus for golden template analysis of a test gray-scale image, the apparatus comprising:

means for acquiring a plurality of sample gray-scale images;

means for determining at least a rotation and a sub-pixel translation of each of said sample gray-scale images;

means for creating a varied plurality of golden template gray-scale images, each golden template gray-scale image being created using a plurality of sample gray-scale images having a substantially similar rotation and sub-pixel translation;

means for storing each golden template gray-scale image in a hierarchical multiresolution one-dimensional array in accordance with an index based on the combination of said rotation and sub-pixel translation of said golden template gray-scale image;

means for acquiring a test gray-scale image;

means for determining a rotation and a sub-pixel translation of said test gray-scale image;

means for using said index to retrieve a golden template gray-scale image having a rotation and a sub-pixel translation that is substantially similar to the rotation and the sub-pixel translation of said test gray-scale image; and means for comparing said test gray-scale image with said retrieved golden template gray-scale image.

9. The apparatus of claim 8, wherein the means for comparing said test gray-scale image with said retrieved golden template gray-scale image includes:

means for providing an error image; and means for performing blob analysis on said error image so as to provide inspection results.

\* \* \* \* \*